United States Patent
Khalaf-Allah

(10) Patent No.: US 9,407,317 B2
(45) Date of Patent: Aug. 2, 2016

(54) DIFFERENTIAL ULTRA-WIDEBAND INDOOR POSITIONING METHOD

(71) Applicant: UMM AL-QURA UNIVERSITY, Makkah (SA)

(72) Inventor: Mohamed Khalaf-Allah, Makkah (SA)

(73) Assignee: UMM AL-QURA UNIVERSITY, Makkah (SA)

( * ) Notice: Subject to any disclaimer, the term of this patent is extended or adjusted under 35 U.S.C. 154(b) by 596 days.

(21) Appl. No.: 13/856,419

(22) Filed: Apr. 3, 2013

(65) Prior Publication Data

US 2014/0301427 A1    Oct. 9, 2014

(51) Int. Cl.
*H04B 1/68* (2006.01)
*G01S 5/02* (2010.01)
*H04B 1/69* (2011.01)

(52) U.S. Cl.
CPC . *H04B 1/69* (2013.01); *G01S 5/021* (2013.01); *G01S 5/0215* (2013.01)

(58) Field of Classification Search
CPC .......... G01S 5/08; G01S 13/06; G01S 5/0284
USPC ........................................................ 342/465
See application file for complete search history.

(56) References Cited

U.S. PATENT DOCUMENTS

| | | | |
|---|---|---|---|
| 5,119,104 A * | 6/1992 | Heller | G01S 5/06 342/450 |
| 7,636,062 B2 | 12/2009 | Ward et al. | |
| 2008/0186231 A1 | 8/2008 | Aljadeff et al. | |
| 2013/0127613 A1 * | 5/2013 | Zhang | A61B 6/4494 340/539.1 |
| 2013/0324150 A1 * | 12/2013 | Cho | H04W 24/00 455/456.1 |

OTHER PUBLICATIONS

Sinan Gezici, Zhi Tian, Georgios B. Giannakis, Hisashi Kobayashi, Andreas F. Molisch,H. (Jul. 2005) Vincent Poor, and Zafer Sahinoglu "Localization via Ultra-Wideband Radios A look at positioning aspects of future sensor networks" IEEE Signal Processing Magazine.
Yihong Qi and Hisashi Kobayashi (2003)"On Relation among Time Delay and Signal Strength based Geolocation Methods" Globecom 2003.

* cited by examiner

*Primary Examiner* — Peter Bythrow
*Assistant Examiner* — Helena Seraydaryan
(74) *Attorney, Agent, or Firm* — Richard C. Litman

(57) ABSTRACT

The differential ultra-wideband indoor positioning method provides differential positioning to increase the accuracy of ultra-wideband (UWB) based indoor position estimation. Knowledge about common errors can be learned by employment of a reference source, where the difference between its known and estimated position (differential operation in solution domain), or the difference between the known and measured ranges (differential operation in measurement domain), provides invaluable information to be utilized in reducing errors in estimating the position of the target source. Differential operation accuracy reaches far beyond the accuracy of the non-differential setting.

1 Claim, 2 Drawing Sheets

DIFFERENTIAL ULTRA-WIDEBAND INDOOR POSITIONING METHOD

BACKGROUND OF THE INVENTION

1. Field of the Invention

The present invention relates to radiation source locators, and particularly to a differential ultra-wideband (UWB) indoor positioning method that accurately determines the location of the UWB radiation source.

2. Description of the Related Art

The interest of research and industry in indoor positioning has greatly increased recently. The market of indoor positioning services include applications in, e.g., health care, search and rescue (SAR), logistics, and security. Unfortunately, the global positioning system (GPS), which performs satisfactorily in most outdoor environments, could not guarantee availability or meet the accuracy requirements for indoor use. These shortages are mainly due to complete or partial signal blockage and extreme multipath conditions.

Ultra-wideband (UWB) technology is considered a promising technology, which could meet the requirements of successful employment of indoor localization systems, since the release of the U.S. Federal Communications Commission (FCC) First Report and Order in 2002 covering commercial use of UWB. High time resolution of impulse radio-based UWB signals, their ability to penetrate through walls and obstacles, and their resistance to jamming and multipath effects are potential properties for indoor positioning capability. Moreover, low cost and low complexity are major advantages of impulse radio-based UWB systems. Localization algorithms based on the time of arrival (TOA) or time difference of arrival (TDOA) measurements yield accuracies in the centimeter level in line-of-sight (LOS) situations. These attractive characteristics are reached at high system costs due to demanding hardware requirements, i.e., very high sampling rates and sub-nanosecond level synchronization between the involved stations/sensors and the object/source to be localized.

A low cost and low complexity UWB ranging system can be constructed based on the received signal strength (RSS) measurements and taking advantage of the small fading characteristic of the UWB signals. The channel characteristics of the target environment have to be sufficiently determined a priori. However, if the source is not very close to enough sensors, the resulting accuracy is in the few meters level and deteriorates for longer distances, even in the LOS case. The major disadvantages of the angle of arrival (AOA)-based positioning technique are the additional costs associated with employment of antenna arrays and the increased computational complexity of AOA estimation due to significant multipath time dispersion of an indoor UWB signal, i.e., a very large number of paths.

The main sources of error in TOA measurements are clock synchronization errors, sensor location uncertainty, multipath propagation, and non-line-of-sight (NLOS) delays due to propagation through materials denser than air. The literature provides several techniques to partially compensate for NLOS errors, e.g., using statistical information of NLOS error, NLOS identification algorithms, or location fingerprinting. Moreover, in a multi-source environment, the accuracy of TOA measurements can be further degraded due to multiple access interference (MAI). Therefore, UWB sources can use different time slots for transmission in order to help reduce the MAI effects.

Thus, a differential ultra-wideband indoor positioning solving the aforementioned problems is desired.

SUMMARY OF THE INVENTION

The differential ultra-wideband indoor positioning method provides differential positioning to increase the accuracy of ultra-wideband (UWB)-based indoor position estimation. Knowledge about common errors can be learned by employment of a reference source, where the difference between its known and estimated position (differential operation in solution domain), or the difference between the known and measured ranges (differential operation in measurement domain), provides invaluable information to be utilized in reducing errors in estimating the position of the target source. Differential operation accuracy reaches far beyond the accuracy of the non-differential setting.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
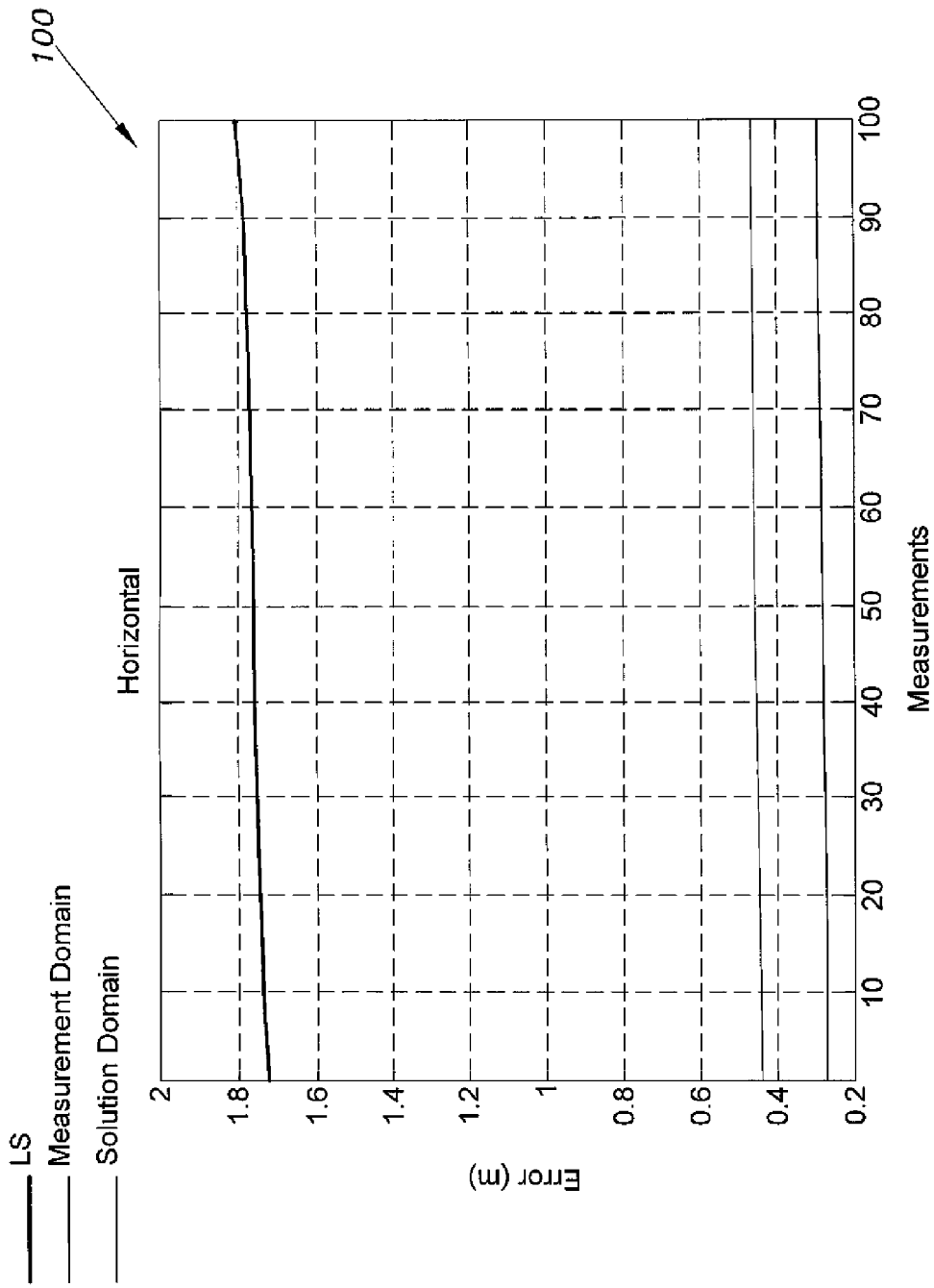
FIG. 1 is a plot showing horizontal accuracy of Differential Positioning in the Measurement Domain (DPMD), Differential Positioning in the Solution Domain (DPSD) and LS estimator.

At the outset, it should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the method described herein. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

The differential ultra-wideband indoor positioning method provides differential positioning to increase the accuracy of ultra-wideband (UWB)-based indoor position estimation. Knowledge about common errors can be learned by employment of a reference source, where the difference between its known and estimated position (differential operation in solution domain), or the difference between the known and measured ranges (differential operation in measurement domain), provides invaluable information to be utilized in reducing errors in estimating the position of the target source. Differential operation accuracy reaches far beyond the accuracy of the non-differential setting.

The utilization of a single reference source (RS) with precisely known position is considered to help reduce ranging errors that are common to both sources, i.e., common to the reference source (RS) and to the source to be localized or target source (TS), using TOA of UWB signals. This is achieved by differencing true parameters (such as ranges to sensors, position, etc.) of the reference source (RS) to their measured or estimated values in order to compute corrections, which can help enhance the accuracy of TS positioning. The developed setting is, thus, called differential UWB (DUWB), where the involved sensors are common to both the target source (TS) and the reference source (RS).

There are two domains in which differential correction can be applied, the ranging or measurement domain, and the positioning (position computation) or solution domain. In the ranging domain, corrections are made for range measurements from the reference source (RS) to the involved sensors, and then applied to the range measurements of the target source (TS) to the same sensors. While in the solution domain, the error in computing the reference source (RS) position using its range measurements is directly applied as a correction to the computed position of the target source (TS).

Error sources that are common to both the reference source (RS) and the target source (TS) include Non-Line-Of-Sight (NLOS) delays, clock synchronization errors, and uncertainties in sensors' locations. The differential technique works best if the common errors are really bias errors. For example, the differential approach can provide online statistics about NLOS errors that will render, e.g., algorithms that identify NLOS signals unnecessary. Other errors that are local to either the target source (TS) or the reference source (RS) include multipath propagation errors, delays and errors associated with the target source (TS) and reference source (RS) hardware, and inter-channel and thermal noise. Multipath errors can be decreased by the differential operation only if they are highly correlated, i.e., the distance between the target source (TS) and the reference source (RS) is small enough. Therefore, depending on the situation, differential corrections can partially, mostly, or completely determine and eliminate errors that decrease the accuracy of target source (TS) position estimation. When the overall errors are dominated by uncommon errors, they render differential corrections impractical. Also note that if we have redundant sensors, i.e., more than three sensors in the case of 3D position estimation problem, the reference source (RS) can determine which measurements to consider, and thus Multiple Access Interference (MAI) errors can be reduced.

With respect to the Formulation and solution of the TOA-based positioning problem, the TOA positioning method is based on a combination of TOA measurements of the source's signal arriving at a minimum of three different sensors in order to determine the position of the source. Furthermore, it is assumed that the source's clock and the sensors' clocks are strictly synchronized, and that the speed of signal propagation is known and equals the speed of light. The distance (range) between the source and any sensor is thus given by:

$$r_i = (t_i - t_0) \cdot c = \sqrt{(x-x_i)^2 + (y-y_i)^2 + (z-z_i)^2} \quad (1)$$

where $t_0$ is the time at which the source started to transmit its signal, $t_i$ is the measured TOA at sensor i, x, y, z are the unknown 3D Cartesian coordinates of the source, and $x_i, y_i, z_i$ are the known 3D Cartesian coordinates of sensor i. A set of n equations of the type given in (1) are required to be able to solve for the source's position $s = [x, y, z]^T$, where $n \geq 3$. A closed-form solution to this system of nonlinear equations can be obtained by a least-squares (LS) formulation. Squaring equation (1) results in an equation characterized by the relation:

$$r_i^2 = (x-x_i)^2 + (y-y_i)^2 + (z-z_i)^2 \quad (2)$$

Subtracting (2) for i=1 from (2) for i=2, . . . , n and rearranging terms, results in a set of n−1 equations of the form:

$$x \cdot (x_1 - x_i) + y \cdot (y_1 - y_i) + z \cdot (z_1 - z_i) = \tfrac{1}{2}(r_i^2 - r_1^2 + K_1 - K_2),$$
$$i = 2, \ldots, n, \quad (3)$$

where $K_i = x_i^2 + y_i^2 + z_i^2$, i=1, . . . , n. Expression (3) can be written in matrix form as:

$$\begin{bmatrix} x_1 - x_2 & y_1 - y_2 & z_1 - z_2 \\ x_1 - x_3 & y_1 - y_3 & z_1 - z_3 \\ \vdots & \vdots & \vdots \\ x_1 - x_n & y_1 - y_n & z_1 - z_n \end{bmatrix} \cdot \begin{bmatrix} x \\ y \\ z \end{bmatrix} = \frac{1}{2} \begin{bmatrix} r_2^2 - r_1^2 + K_1 - K_2 \\ r_3^2 - r_1^2 + K_1 - K_3 \\ \vdots \\ r_n^2 - r_1^2 + K_1 - K_n \end{bmatrix} \quad (4)$$

Then, (4) is rewritten in compact form as:

$$Hs = b. \quad (5)$$

where H, s, and b are easily recognized by inspecting (4) and (5). Thus, the LS solution of (5) is characterized by the relation:

$$\hat{s} = (H^T H)^{-1} H^T b. \quad (6)$$

Differential Positioning in the Measurement Domain (DPMD) begins with computing correction factors to range measurements made at every involved sensor with respect to the reference source (RS), which will then be applied to the range measurements made at the same sensors with respect to the target source (TS), see Algorithm 1. The correction factor corresponding to sensor i is expressed as (Algorithm 1, line 4):

$$\eta_i = \frac{r_{i,RS}^t}{r_{i,RS}^m}. \quad (7)$$

It should be understood that $r_{i,RS}^t$ is the true (known) range from the reference source (RS) to sensor i, and that $r_{i,RS}^m$ is the corresponding measured range. The correction factors are then applied as (Algorithm 1, line 5):

$$r_{i,TS}^c = \eta_i \cdot r_{i,TS}^m \quad (8)$$

where $r_{i,TS}^c$ is the corrected i-th range measurement with respect to the target source (TS), and $r_{i,TS}^m$ is the corresponding measured range. Finally, the position of the target source (TS) $\hat{s}_{TS}^{MD}$ is computed according to Equation (6) using the corrected ranges for constructing b (Algorithm 1, line 7).

Algorithm 1: Differential Positioning in the Measurement Domain (DPMD)

1: Algorithm DPMD($r_{i,RS}^t, r_{i,RS}^m, r_{i,TS}^m, S_i, S_{RS}$)
2: $S_i = [x_i, y_i, z_i]^T$, $S_{RS} = [x_{RS}, y_{RS}, z_{RS}]^T$   //Known parameters
3: for i = 1 : n do
4: $\quad \eta_i = \frac{r_{i,RS}^t}{r_{i,RS}^m}$    //Compute correction factors
5: $\quad r_{i,TS}^c = \eta_i \cdot r_{i,TS}^m$    //Apply correction factors
6: endfor
7: $\hat{s}_{TS}^{MD} = (H^T H)^{-1} H^T b = [\hat{x}, \hat{y}, \hat{z}]^T$   //Final estimate
8: return($\hat{x}, \hat{y}, \hat{z}$)

Regarding Differential Positioning in the Solution Domain (DPSD), the known position of the reference source (RS) is estimated by Equation (6) using the range measurements (Algorithm 2, line 3), and then an error vector e is computed (Algorithm 2, line 4) by subtracting the estimated position of the reference source (RS) from its known position as:

$$e = \hat{s}_{RS} - s_{RS}, \quad (9)$$

where $\hat{s}_{RS}$ and $s_{RS}$ are the LS estimated and true position of the RS respectively. Next, the position of the TS is also estimated by Equation (6) using the range measurements (Algorithm 2, line 5). We obtain the final estimate of the TS's position (Algorithm 2, line 6) by adding the error vector e computed in (9) to the LS estimate as:

$$\hat{s}_{TS}^{SD} = \hat{s}_{TS} + e, \quad (10)$$

where $\hat{s}_{TS}^{SD}$ is the position estimate of the TS using the differential operation in the solution domain, and $\hat{s}_{TS}$ is the position estimate of the TS using the LS algorithm in (6) and the uncorrected range measurements.

---
Algorithm 2: Differential Positioning in the Solution Domain (DPSD)
---
1: Algorithm DPMD ( $r_{i,RS}{}^t$, $r_{i,RS}{}^m r_{i,TS}{}^m$, $S_i$, $S_{RS}$)
2: $S_i=[x_i, y_i, z_i]^T$, $S_{RS} = [x_{RS}, y_{RS}, z_{RS}]^T$ //Known parameters
3: $\hat{s}_{RS} = (H^T H)^{-1} H^T b_{RS}{}^m$     //Estimate RS's position
4: $e = \hat{S}_{RS} - S_{RS}$     //Compute RS's position error
5: $\hat{s}_{TS} = (H^T H)^{-1} H^T b_{TS}{}^m$     //Estimate TS's position
6: $\hat{s}_{TS}^{SD} = \hat{s}_{TS} + e = [\hat{x}, \hat{y}, \hat{z}]^T$     //Final estimate applies error vector
7: return($\hat{x}, \hat{y}, \hat{z}$)

---

An exemplary numerical example includes four sensors placed at (0,0,1), (5,0.3), (5,5,1), and (0,5,3). The reference source (RS) was placed at (2.5,2.5,2), where all coordinates are in meters. The trajectory of the target source (TS) is a part of a helical path with 100 measurement points (coordinates), generated according to the following Matlab code:

$$z=1:pi/155:0.96*pi;$$

$$x=2.5+\sin(z);$$

$$y=2.5+\cos(z);$$

where x, y, and z are the set of the true coordinates of the target source (TS) along the whole trajectory.

A simple example illustrates the potential of the proposed differential operation when the common errors are dominant and can be considered as bias errors. The standard deviation of the ranging errors was set almost equal at the four sensors at about 1.2 meters. The final results are the average of 10,000 runs of the experiment, and the error is the distance between the estimate and true values. The accuracies of the LS estimate, differential positioning in measurement domain (DPMD), and differential positioning in solution domain (DPSD), have been compared separately in the horizontal (XY) plane (FIG. 1) and the vertical (Z) plane (FIG. 2).

Figure 2:
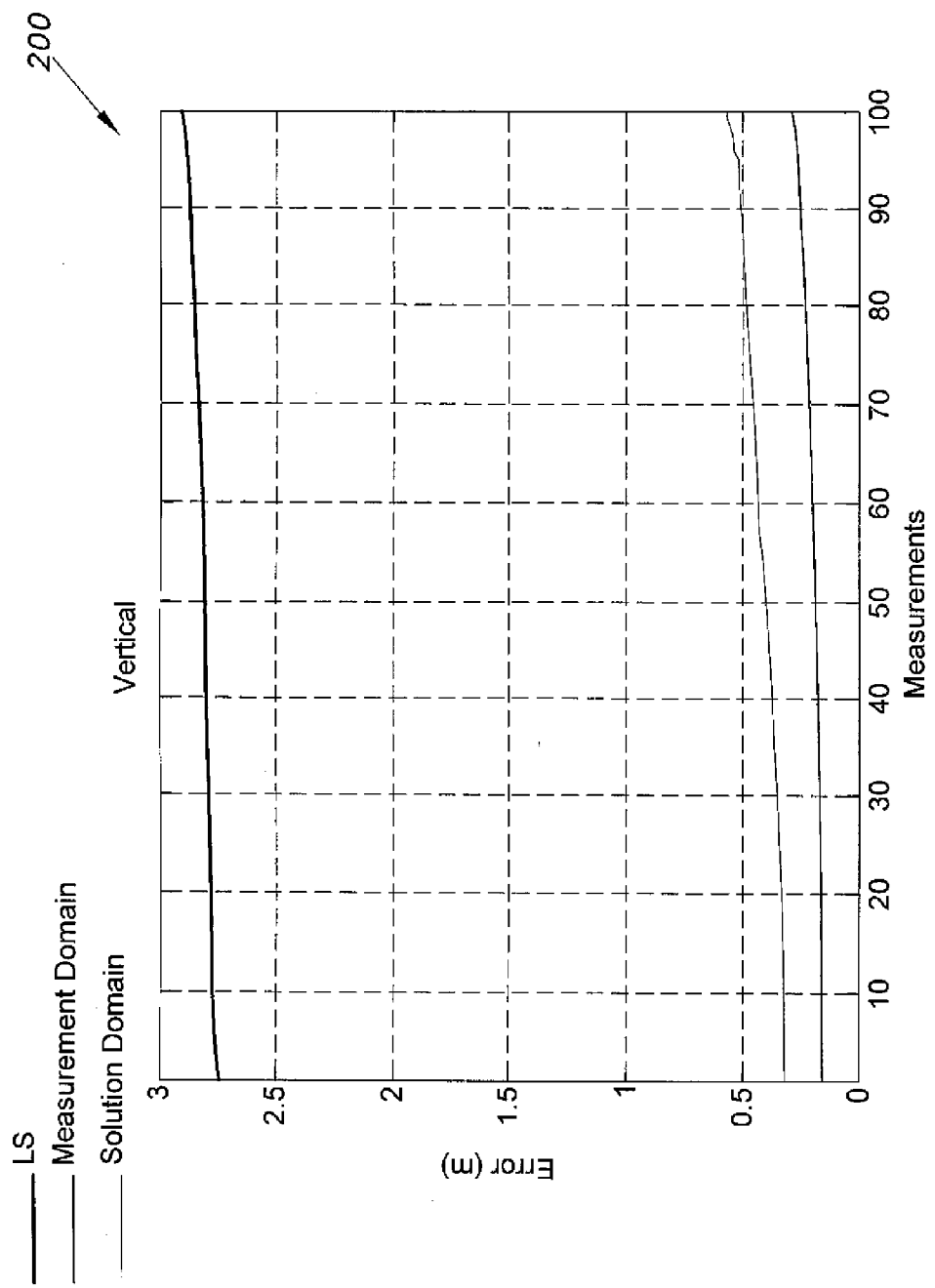
FIG. 2 is a plot showing vertical accuracy of the DPMD, DPSD and LS estimator.

Plot 100 of FIG. 1 illustrates the horizontal accuracies of the different estimators. The accuracy of the LS estimator was between approx. 1.7 and 1.8 meters. On the other hand, both differential techniques achieved accuracies better than 0.3 and 0.5 meters with the DPMD and DPSD, respectively. Similar results can be seen in the vertical plane on plot 200 of FIG. 2. The vertical positioning error of the LS estimate was between 2.7 and 2.9 meters. The DPMD achieved a vertical accuracy between 15 and 30 cm, where the vertical accuracy of DPSD reached between 30 and 57 cm. We can also see that DPMD performs better than the DPSD by about 18 cm and 25 cm in the horizontal and vertical components, respectively.

Most accurate TOA-based positioning can be obtained for the single source scenario in a single-path and LOS situation, which is extremely ideal. Therefore, the proposed DUWB can provide more information about common errors for accuracy enhancement in practical scenarios. Generally, the shorter the distance between the reference source (RS) and target source (TS), or the smaller the uncommon errors, the better the accuracy that can result from the differential operation.

It is to be understood that the present invention is not limited to the embodiments described above, but encompasses any and all embodiments within the scope of the following claims.

I claim:

1. A computer software product, comprising a non-transitory medium readable by a processor, the non-transitory medium having stored thereon a set of instructions for performing a differential ultra-wideband indoor positioning method, the set of instructions including:
   (a) a first sequence of instructions which, when executed by the processor, causes said processor to store in memory a precisely known position of a single reference source (RS) and known positions of n UWB sensors, n≥3, wherein both a target source (TS) and said single RS are transmitting ultra-wideband (UWB) signals;
   (b) a second sequence of instructions which, when executed by the processor, causes said processor to acquire times of arrival (TOA) of both said RS and said TS;
   (c) a third sequence of instructions which, when executed by the processor, causes said processor to estimate range and position of said RS and said TS based on said TOA of said ultra-wideband (UWB) signals and known positions of n UWB sensors;
   (d) a fourth sequence of instructions which, when executed by the processor, causes said processor to compute the difference between true and estimated range and position parameters of said RS based on said stored precisely known position of said RS, known positions of n UWB sensors, and n TOA measurements;
   (e) a fifth sequence of instructions which, when executed by the processor, causes said processor to compute correction factors for said TS estimated range and position based on said computed difference of said RS range and positioning parameters;
   (f) a sixth sequence of instructions which, when executed by the processor, causes said processor to recalculate said TS estimated range and position based on said correction factors, wherein sensors involved in the acquisition of said RS and said TS TOA are common to both said TS and said RS;
   a seventh sequence of instructions which, when executed by the processor, causes said processor to calculate $\eta_i$ as part of said correction factors computation, said $\eta_i$ calculation being characterized by the relation:

$$\eta_i = \frac{r_{i,RS}^t}{r_{i,RS}^m},$$

where $r_{i,RS}{}^t$ is said known range from said reference source (RS) to said sensor i and $r_{i,RS}{}^m$ is said corresponding measured range;
   an eighth sequence of instructions which, when executed by the processor, causes said processor to calculate target source position $\hat{s}_{TS}^{MD}$ as part of said target source range and position recalculation, said target source position calculation being characterized by the relation:

$$r_{i,TS}^c = \eta_i \cdot r_{i,TS}^m,$$

where $r_{i,TS}{}^c$ is the corrected i-th range measurement with respect to the target source (TS), and $r_{i,TS}{}^m$ is the corresponding measured range;

a ninth sequence of instructions which, when executed by the processor, causes said processor to perform a TS position finalizing calculation characterized by the relation:

$$\hat{s}_{TS}^{MD} = (H^T H)^{-1} H^T b = [\hat{x}, \hat{y}, \hat{z}]^T,$$

where $$H = \begin{bmatrix} x_1 - x_2 & y_1 - y_2 & z_1 - z_2 \\ x_1 - x_3 & y_1 - y_3 & z_1 - z_3 \\ \vdots & \vdots & \vdots \\ x_1 - x_n & y_1 - y_n & z_1 - z_n \end{bmatrix}, s = \begin{bmatrix} x \\ y \\ z \end{bmatrix},$$

$$b = \frac{1}{2} \begin{bmatrix} r_2^2 - r_1^2 + K_1 - K_2 \\ r_3^2 - r_1^2 + K_1 - K_3 \\ \vdots \\ r_n^2 - r_1^2 + K_1 - K_n \end{bmatrix},$$

where $K_i = x_i^2 + y_i^2 + z_i^2$, $t=1, \ldots, n$, x, y, z are the unknown 3D Cartesian coordinates of the source, and $x_i, y_i, z_i$ are the known 3D Cartesian coordinates of sensor i; and Hs=b.

* * * * *